(12) United States Patent
Lim

(10) Patent No.: US 12,167,008 B2
(45) Date of Patent: Dec. 10, 2024

(54) OPERATION OF VIDEO DECODING ENGINE FOR EVC

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/718,088

(22) Filed: Apr. 11, 2022

(65) Prior Publication Data

US 2022/0337855 A1 Oct. 20, 2022

Related U.S. Application Data

(60) Provisional application No. 63/177,249, filed on Apr. 20, 2021.

(51) Int. Cl.
*H04N 19/44* (2014.01)
*H04N 19/174* (2014.01)
*H04N 19/463* (2014.01)

(52) U.S. Cl.
CPC ........... *H04N 19/44* (2014.11); *H04N 19/174* (2014.11); *H04N 19/463* (2014.11)

(58) Field of Classification Search
CPC ............... H04N 1/2307; H04N 1/2323; H04N 1/40031; H04N 1/4005; H04N 19/174; H04N 19/40; H04N 19/436; H04N 19/44; H04N 19/463
See application file for complete search history.

(56) References Cited

U.S. PATENT DOCUMENTS

| | | | |
|---|---|---|---|
| 10,244,239 B2 | 3/2019 | Horowitz | |
| 10,944,994 B2* | 3/2021 | Rusert | H04N 21/8451 |
| 2014/0192868 A1 | 7/2014 | Chen et al. | |
| 2015/0319452 A1* | 11/2015 | Lewis | H04N 19/12 375/240.12 |
| 2018/0376126 A1* | 12/2018 | Hannuksela | H04N 13/161 |
| 2019/0297339 A1 | 9/2019 | Hannuksela et al. | |

(Continued)

FOREIGN PATENT DOCUMENTS

| | | |
|---|---|---|
| EP | 3800890 A1 | 4/2021 |
| WO | 2020053369 A1 | 3/2020 |

OTHER PUBLICATIONS

International Search Report and Written Opinion of the International Searching Authority issued Jul. 15, 2022 regarding International Application No. PCT/KR2022/005598, 9 pages.

(Continued)

*Primary Examiner* — Michael J Hess
*Assistant Examiner* — Naod W Belai

(57) ABSTRACT

A video decoding device includes a communication interface and a processor operably coupled to the communication interface. The communication interface is configured to receive an input elementary bitstream including a plurality of essential video coding (EVC) slices. The processor is configured to modify the plurality of EVC slices in the input elementary bitstream, and rewrite parameters of the input elements stream based on the modified plurality of EVC slices. The communication interface is further configured to transmit an output elementary bitstream with the modified plurality of EVC slices and the rewritten parameters.

20 Claims, 11 Drawing Sheets

(56) References Cited

U.S. PATENT DOCUMENTS

2019/0387238 A1* 12/2019 Nakagami .............. H04N 19/48
2020/0137391 A1    4/2020 Li et al.
2020/0366962 A1   11/2020 Lim
2021/0076035 A1    3/2021 Hsu et al.
2021/0211735 A1*   7/2021 Stockhammer ........ H04N 21/84
2021/0218965 A1*   7/2021 Li ........................ H04N 19/174
2021/0329272 A1*  10/2021 Rusanovskyy ...... H04N 19/117

OTHER PUBLICATIONS

Choi et al., "An Overview of the MPEG-5 Essential Video Coding Standard", IEEE Signal Processing Magazine, May 2020, vol. 37, Issue 3, pp. 160-167.

Choi et al., "Text of ISO/IEC CD 23094-1, Essential Video Coding", International Organisation for Standardisation ISO/IEC JTC1/SC29/WG11, N18568, Jul. 2019, 292 pages.

* cited by examiner

OPERATION OF VIDEO DECODING ENGINE FOR EVC

CROSS-REFERENCE TO RELATED APPLICATION AND PRIORITY CLAIM

This application claims priority under 35 U.S.C. § 119(e) to U.S. Provisional Patent Application No. 63/177,249 filed on Apr. 20, 2021, which is hereby incorporated by reference in its entirety.

TECHNICAL FIELD

This disclosure relates generally to essential video coding (EVC) devices and processes. More specifically, this disclosure relates to operation of a video decoding engine for EVC.

BACKGROUND

For different video applications, entire frames are not needed for display. For example, a mixed reality frame or volumetric content may provide information that is not currently visible on the display. Virtual desktop infrastructure defines concepts of operations without providing significant details regarding implementation of manipulation operations for bitstreams. Detailed operation procedures for EVC video bitstreams are needed to apply bitstream manipulation operations.

SUMMARY

This disclosure provides an operation of a video decoding engine for EVC.

In a first embodiment, an apparatus includes video decoding device includes a communication interface and a processor operably coupled to the communication interface. The communication interface is configured to receive an input elementary bitstream including a plurality of essential video coding (EVC) slices. The processor is configured to modify the plurality of EVC slices in the input elementary bitstream, and rewrite parameters of the input elements stream based on the modified plurality of EVC slices. The communication interface is further configured to transmit an output elementary bitstream with the modified plurality of EVC slices and the rewritten parameters.

In a second embodiment, a method includes receiving, using a communication interface of the video decoding device, an input elementary bitstream including a plurality of essential video coding (EVC) slices. The method also includes modifying, using a processor operably coupled to the communication interface, the plurality of EVC slices in the input elementary bitstream. The method further includes rewriting, using the processor, parameters of the input elements stream based on the modified plurality of EVC slices. The method additionally includes transmitting, using the communication interface, an output elementary bitstream with the modified plurality of EVC slices and the rewritten parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Figure 1:
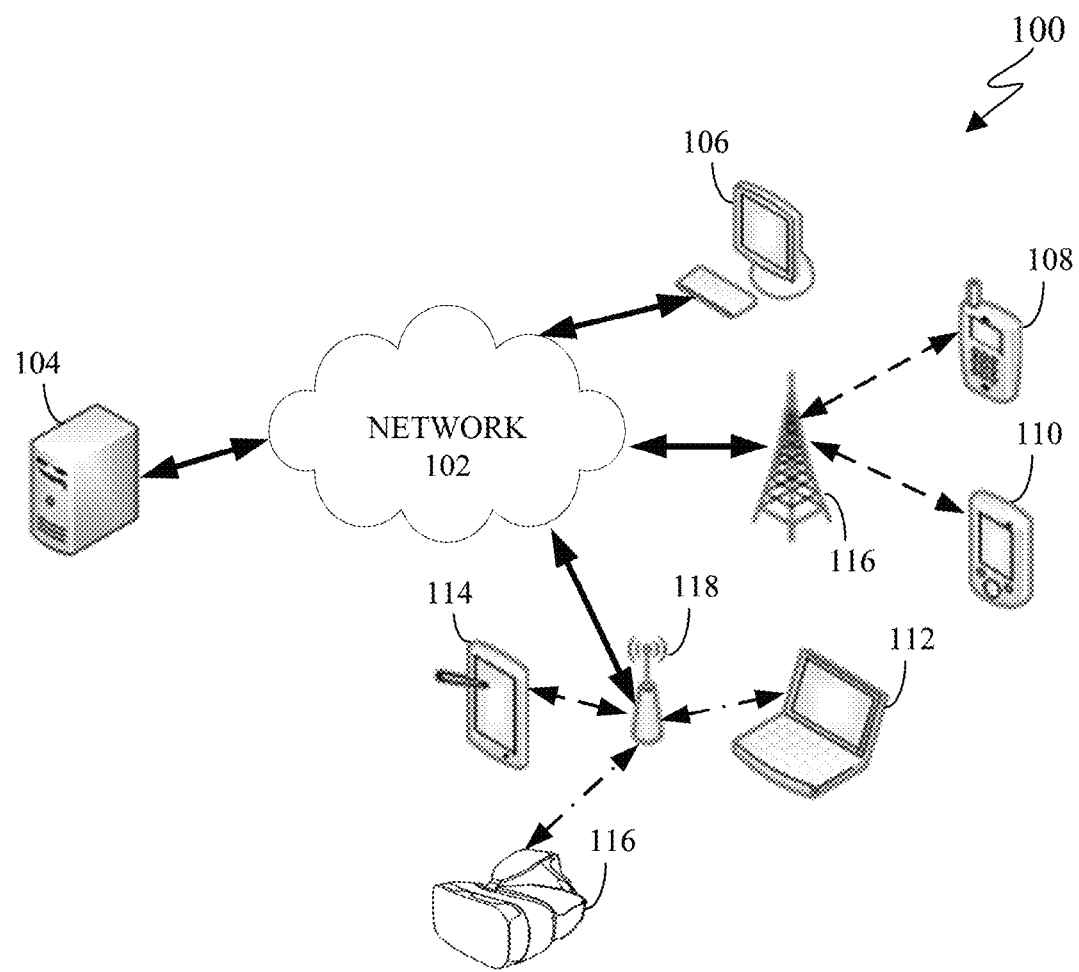
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
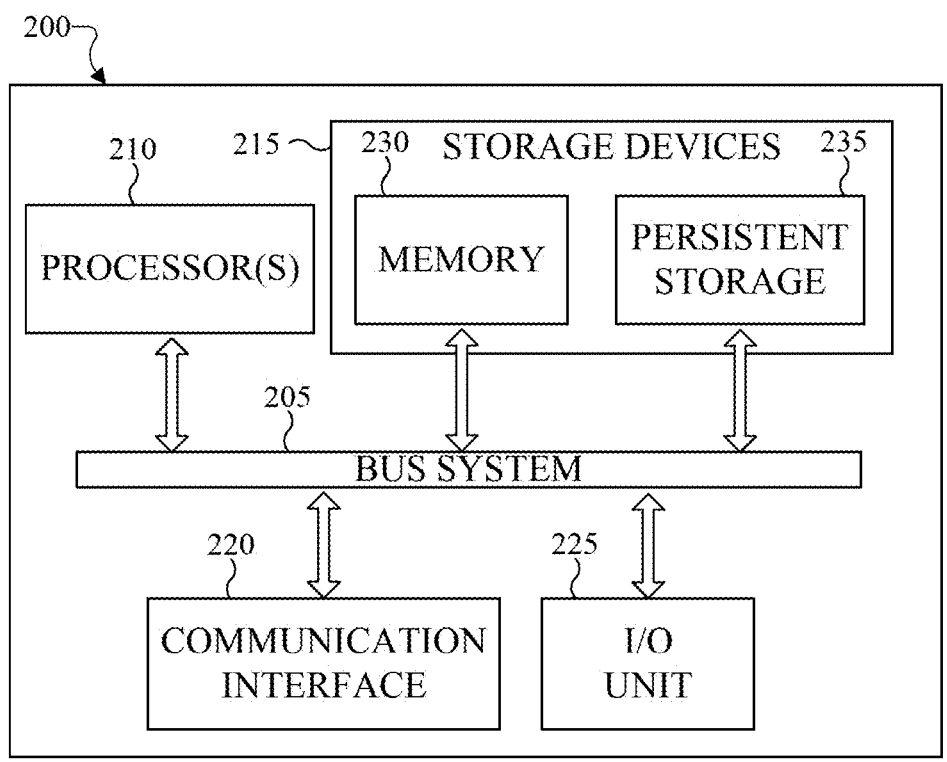
FIGS. 2 and 3 illustrate example electronic devices in accordance with an embodiment of this disclosure.
Figure 3:
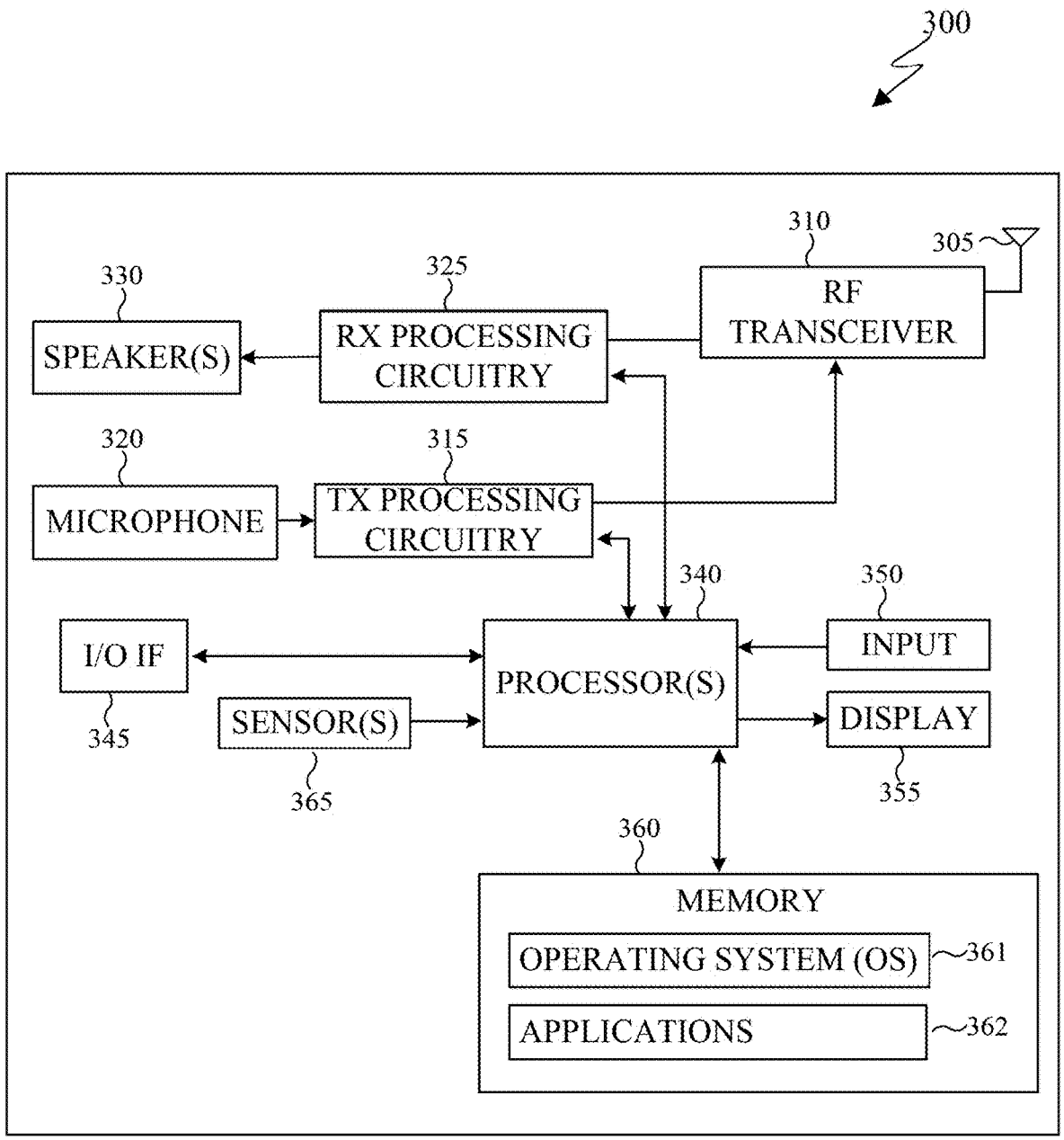

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on two dimensional (2D) frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometry point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
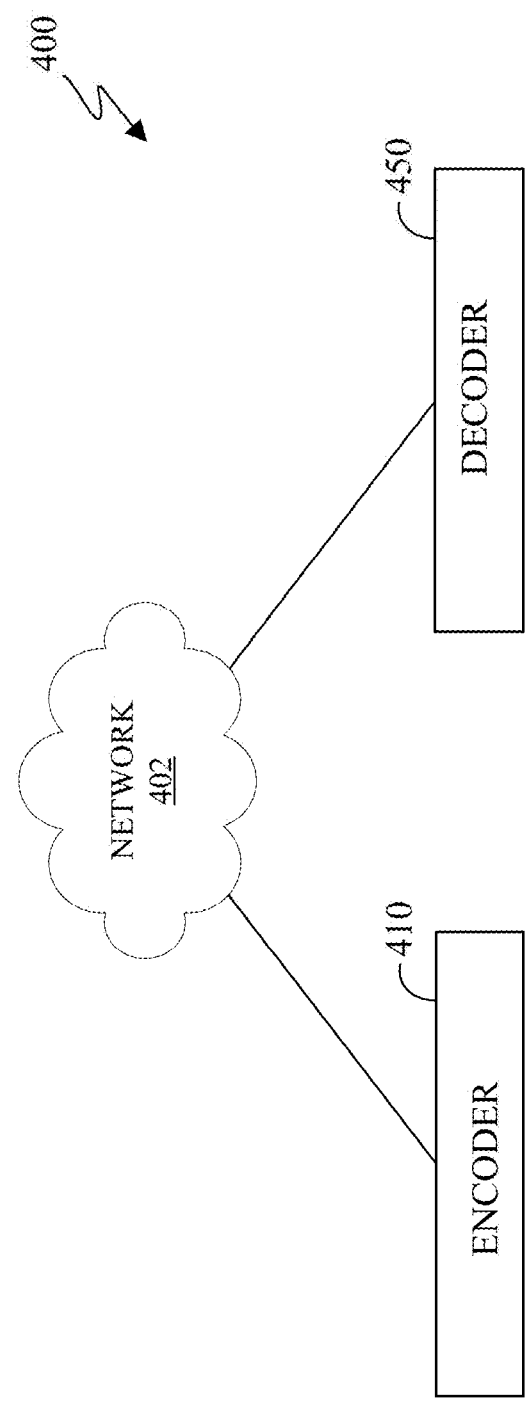
FIG. 4 illustrates a block diagram of an example environment-architecture in accordance with an embodiment of this disclosure.

FIG. 4 illustrates a block diagram of an example environment-architecture 400 for storage of EVC decoder configuration information in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 transmits frames representing the media content as an encoded bitstream. The bitstream can be transmitted to an information repository (such as a database) or an electronic device that includes a decoder (such as the decoder 450), or the decoder 450 itself through the network 402.

The decoder 450 can receive a bitstream that represents media content. The bitstreams can include data representing EVC decoder configuration information. In certain embodiments, the decoder 450 can decode the bitstream that includes the multiple frames and auxiliary information that are used when reconstructing the media content. The EVC decoder configuration information associated with one frame can indicate that the decoder is to reference auxiliary information from another frame when reconstructing the media content.

Although FIG. 4 illustrates examples of an encoder and a decoder, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5:
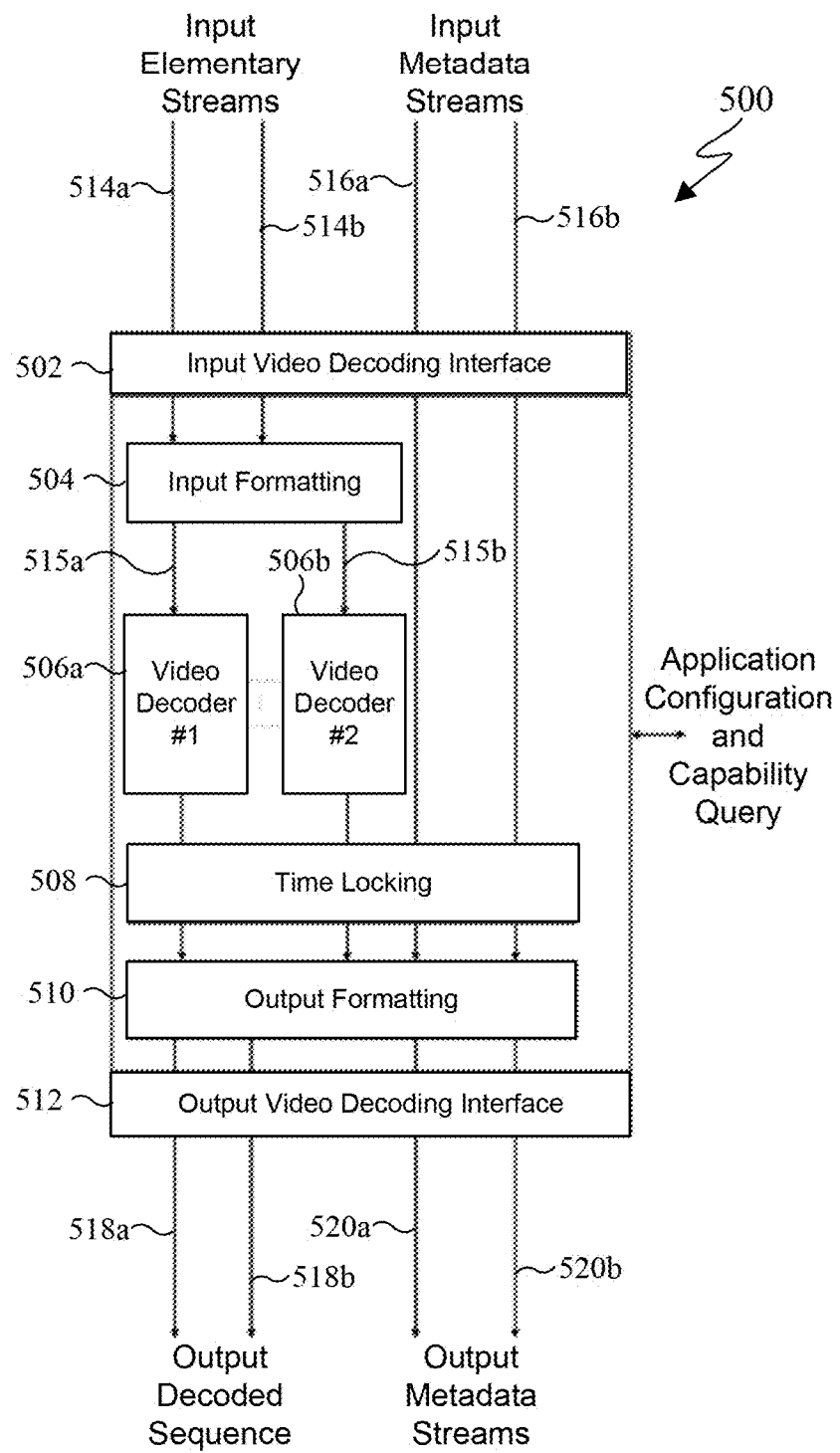
FIG. 5 illustrates an example decoding engine for immersive media according to various embodiments of the present disclosure.

FIG. 5 illustrates an example decoding engine 500 for immersive media according to various embodiments of the present disclosure. The interface illustrated in FIG. 5 is for illustration only and should not be construed as limiting. FIG. 5 does not limit the scope of the present disclosure to any particular structure and other embodiments can be used without departing from the scope of the present disclosure.

FIG. 5 illustrates a video decoding engine 500 according to various embodiments of the present disclosure. In some embodiments, the video decoding engine 500 can be the decoder 450. In various embodiments, the video decoding engine 500 can be physically disposed in a client device such as the HMD 116.

The video decoding engine 500 includes an input decoding interface 502, an input formatting function 504, a first video decoder instance 506a, an nth video decoder instance 506b, a time locking function 508, an output formatting function 510, and an output decoding interface 512. The input video decoding interface 502 can receive one or more input elementary bitstreams 514, such as input elementary bitstreams #1 514a through #n 514b, and one or more input metadata streams 516, such as input metadata streams #1 516a through #n 516b. The input decoding interface 502 can receive any number of input elementary bitstreams 514 and input metadata streams 516 and the two metadata streams 516a, 516b and two elementary streams 514a, 514b illustrated in FIG. 5 should not be construed as limiting.

In the video decoding engine 500, an input formatting function 504 is applied to the input elementary bitstreams 514. The input formatting function 504 can apply one or more bitstream manipulation operations on the input elementary bitstreams 514 to generate an output elementary bitstream 515. For example, an input formatting function 504 is applied to the first input elementary bitstream 514a and an nth input elementary bitstream 514b to generate a first output elementary bitstream 515a and an nth output elementary bitstream 515b. In certain embodiments, applications may not need an entire frame of a video for display. For example, mixed reality or volumetric content can have portions not visible or shown to the user. Exemplary bitstream manipulations are described below in relation to FIGS. 5-7B.

After the input formatting function 504 is applied, each output elementary bitstream 515 is decoded in a video decoder instance 506. For example, the first output elementary bitstream 515a is decoded by a video decoder instance #1 506a and the nth output elementary bitstream #n 515b is decoded by a video decoder instance #n 506b. The input formatting function 504 and the video decoder instance 506 may not be applied to the input formatting metadata streams 516. The metadata streams 516 can progress directly to the time locking function 508.

After the input elementary bitstreams 514 pass through the video decoder instances 506, the video decoding engine 500 performs a time locking function 508 on each of the decoded elementary streams and the metadata streams 516. The time locking function 508 synchronizes each individual stream in time. After the time locking function 508 is applied, the video decoding engine 500 performs an output formatting function 510 on each stream. Once each stream has been formatted, the output video decoding interface 512 outputs formatted output decoded sequences 518 corresponding to the input elementary bitstreams 514 and output metadata streams 520 corresponding to the input metadata streams 516. For example, the input elementary bitstreams #1 514a and #n 514b are output as decoded sequences #1 518a and #n 518b, respectively, while the input metadata streams #1 516a and #n 516b are output as metadata streams #1 520a and #n 520b, respectively.

Figure 6:
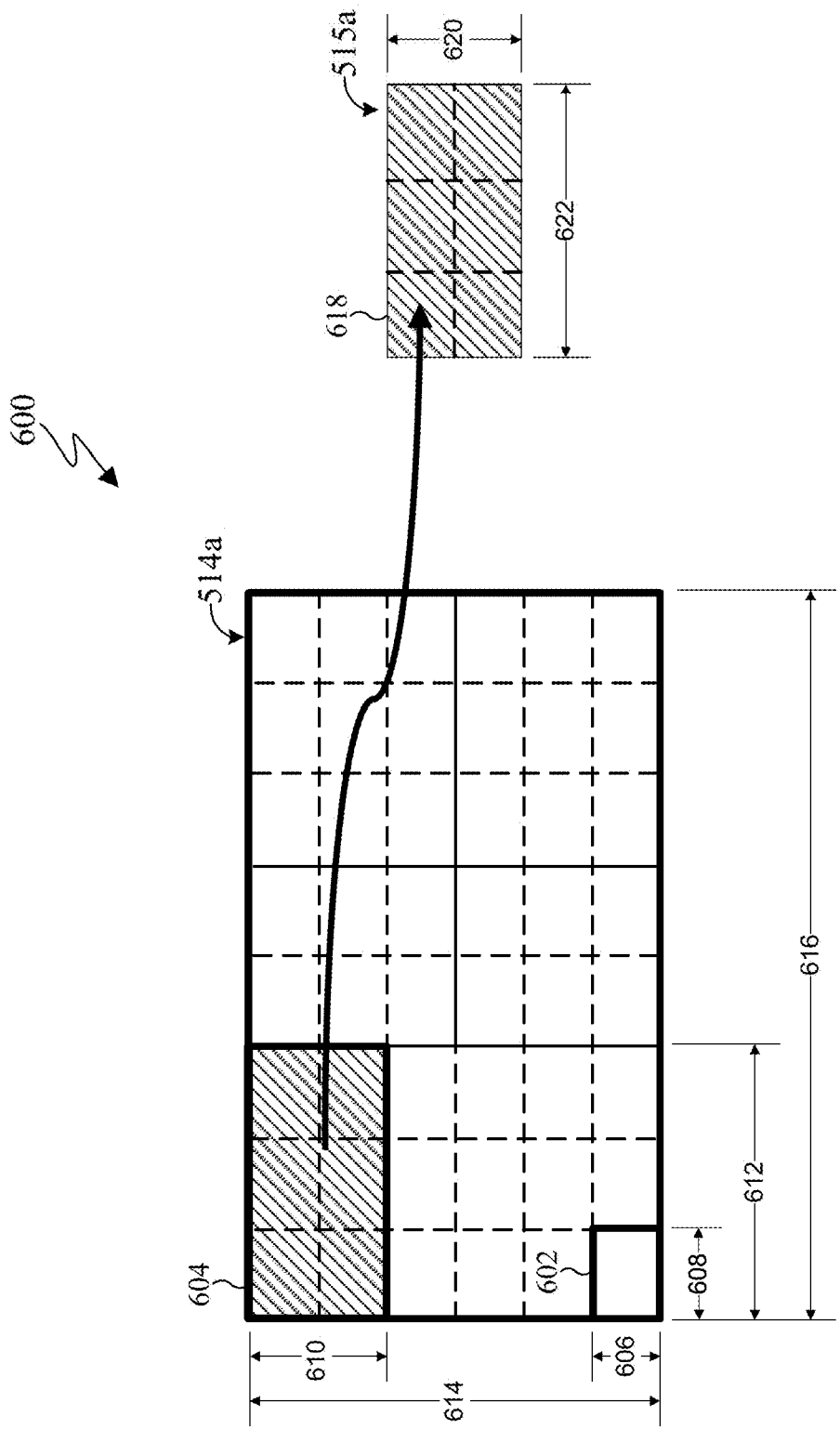
FIG. 6 illustrates an example filtering functions according to various embodiments of the present disclosure.

FIG. 6 illustrates an example filtering function 600 according to various embodiments of the present disclosure; The embodiment of the filtering function 600 illustrated in FIG. 6 is for illustration only. FIG. 6 does not limit the scope of this disclosure to any particular implementation of a decoder.

As shown in FIG. 6, an input elementary bitstream 514a can be arranged as a plurality of tiles 602 grouped into one or more slices 604. The tiles 602 can be have a tile height 606 and tile width 608. The tile height 606 and width 608 can be standardized across the input elementary bitstream 514a or vary by rows of tiles 602 and columns of tiles 602. The tiles 602 can be grouped into slices 604. The slices 604 in the input elementary bitstream 514a can vary. For instance, a first column of slices 604 can include each include three columns and one or more rows of tiles 602 and a second column of tiles 602 can each include two column and one or more rows of tiles 602. A number of rows of tiles 602 in a slice 604 can define a slice height 610 and a number of columns of tiles 602 in a slice 604 can define a slice width 612. Similarly, a number of rows of tiles 602 in the input elementary bitstream 514a can define a stream height 614 and a number of columns of tiles 602 in the input elementary bitstream 514a can define a stream width 616.

For the filtering function 600 applied to the input elementary bitstream 514a, one or more slices 618 can be extracted from the input elementary bitstream 514a and the one or more extracted slices as an output elementary bitstream 515a. During this operation, parameters of the bitstream, such as a sequence parameter set (SPS), a picture parameter set (PPS) and slice header, need to be rewritten to represent a size of the video of the output elementary bitstream 515a, the information about the slices 604 and tiles 602 such as the number of tile rows (output bitstream height 620), the number of tile columns (output bitstream width 622), and the identification (ID) of the tiles 602 in the needs to be updated.

The EVC input elementary bitstream 514a passed as argument of the filtering function 600 can comply with one of the smallest values of the ID of the tiles 602 in each slice 604 can be equal to the object identifier passed as argument of the filtering function 600.

The output EVC elementary stream 515a generated as output of the filtering function 600 shall comply with a number of access units in the output elementary bitstream 515a can be equal to a number of access units in the input elementary bitstream 514a. The number of video coding layer (VCL) network abstraction layer (NAL) units in the output elementary bitstream 515a is equal to a number of VCL NAL units with a smallest value of the ID of the tiles 602 in the slice 604 equal to object identifier passed as argument of the filtering function 600. For each VCL NAL unit in the output elementary bitstream 515a, a VCL NAL unit in included in the input elementary bitstream that is bit exact identical. All the NAL units in the output elementary bitstream 515a can have a same smallest value of the ID of the tiles 602 in the slice value and such value can be equal to the object identifier passed as argument of the filtering function 600.

Although FIG. 6 illustrates a filtering function 600, various changes may be made to FIG. 6. For example, the sizes, shapes, and dimensions of components in the filtering function 600 can vary as needed or desired. In addition, the filtering function 600 may be used in any other suitable decoding process and is not limited to the specific processes described above.

Figure 7A:
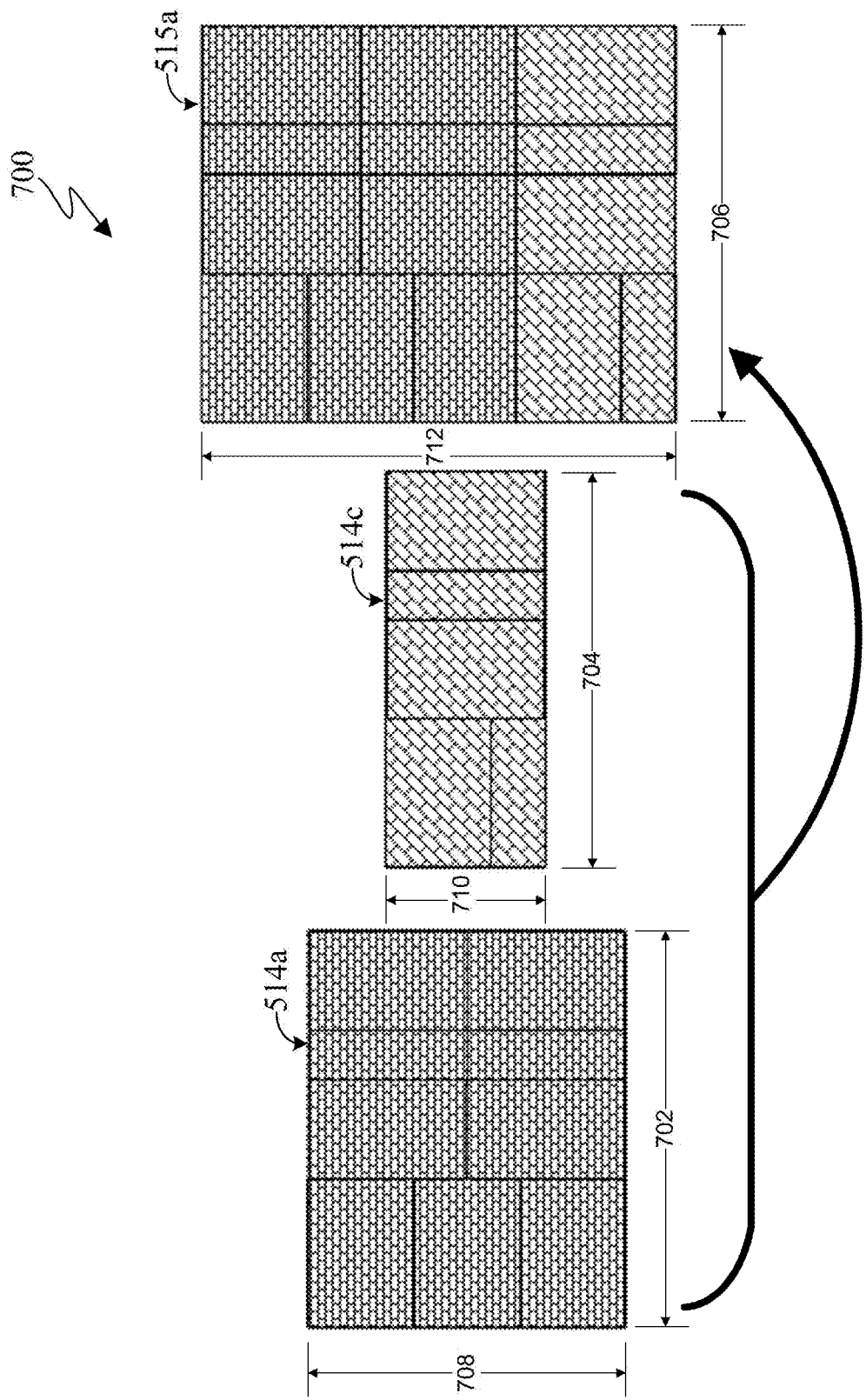
FIGS. 7A and 7B illustrates example inserting functions according to various embodiments of the present disclosure.
Figure 7B:
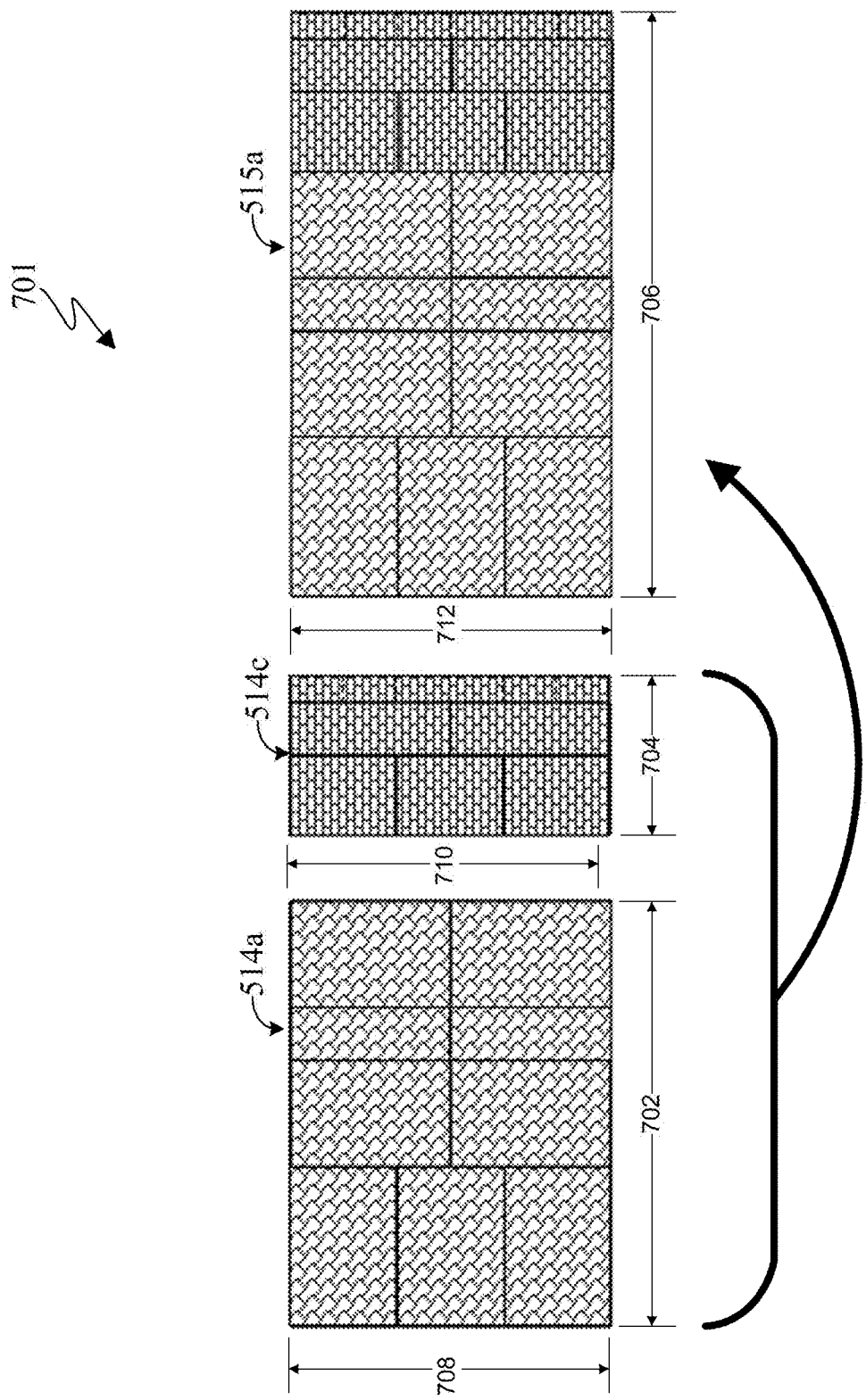

FIGS. 7A and 7B illustrates example inserting functions 700, 701 according to various embodiments of the present disclosure. In particular, FIG. 7A illustrates an example vertical inserting function 700 and FIG. 7B illustrates an example horizontal inserting function 701. The embodiments of the vertical inserting function 700 and horizontal inserting function 701 illustrated in FIGS. 7A and 7B are for illustration only. FIGS. 7A and 7B do not limit the scope of this disclosure to any particular implementation of a decoder.

As shown in FIG. 7A, a vertical inserting function 700 can be applied to combine two or more input elementary bitstreams 514 into an output elementary bitstream 515. If a first stream width 702 of a first input elementary bitstream 514a and a second stream width 704 of a second input elementary bitstream 514c are identical, then the first elementary bitstream 514a and the second elementary bitstream 514c are vertically concatenated into an output elementary bitstream 515a by applying the vertical inserting function 700. An output stream width 706 for the output elementary bitstream 515a is equal to the first stream width 702 and the second stream width 704.

A first stream height 708 of the first input elementary bitstream 514a and a second stream height 710 of the second input elementary bitstream 514c can be the same or different for the vertical inserting function 700. An output stream height 712 for the output elementary bitstream 515a is equal to the first stream height 708 added to the second stream height 710.

As shown in FIG. 7B, a horizontal inserting function 701 can be applied to combine two or more input elementary bitstreams 514 into an output elementary bitstream 515. If a first stream height 708 of a first input elementary bitstream 514a and a second stream height 710 of a second input elementary bitstream 514c are identical, then the first elementary bitstream 514a and the second elementary bitstream 514c are horizontally concatenated into an output elementary bitstream 515a by applying the horizontal inserting function 701. An output stream height 712 for the output elementary bitstream 515a is equal to the first stream height 708 and the second stream height 710.

A first stream width 702 of the first input elementary bitstream 514a and a second stream width 704 of the second input elementary bitstream 514c can be the same or different for the horizontal inserting function 701. An output stream width 706 for the output elementary bitstream 515a is equal to the first stream width 702 added to the second stream width 704.

During these operations, SPS, PPS and slice header needs to be rewritten to represent the size of the video of the output elementary bitstream 515, the information about the slices 604 and tiles 602, such as the number of tile rows and the ID of the tiles, needs to be updated.

Two EVC input elementary bitstreams 514 passed as argument of the inserting function 700, 701 can comply with the following rules. At least one of the values of pic_width_in_luma_samples or pic_height_in_luma_samples of the two input elementary bitstreams 514 are identical. If the values of pic_width_in_luma_samples are identical, then the values of num_tile_columns_minus1 are identical. If the values of pic_height_in_luma_samples are identical, then the values of num_tiles_row_minus1 are identical. If a SPS or PPS in the first input elementary bitstream 514 has the same identifier than a SPS or PPS in the second input elementary bitstream 514, then those two SPSs or two PPSs can have the same payload.

An EVC output elementary bitstream 515 generated as output of the inserting function 700, 701 complies to the following rules. The number of VCL NAL units in the output elementary bitstream 515 is equal to a sum of the number of VCL NAL units in both input elementary bitstreams 514. For each VCL NAL unit in the output elementary bitstream 515, a VCL NAL unit is included in one of the two input elementary bitstreams that is bit exact identical.

Although FIGS. 7A and 7B illustrate an inserting functions 700, 701, various changes may be made to FIGS. 7A and 7B. For example, the sizes, shapes, and dimensions of components in the vertical inserting function 700 and horizontal inserting function 701 can vary as needed or desired. In addition, the vertical inserting function 700 and horizontal inserting function 701 may be used in any other suitable decoding process and is not limited to the specific processes described above.

Figure 8A:
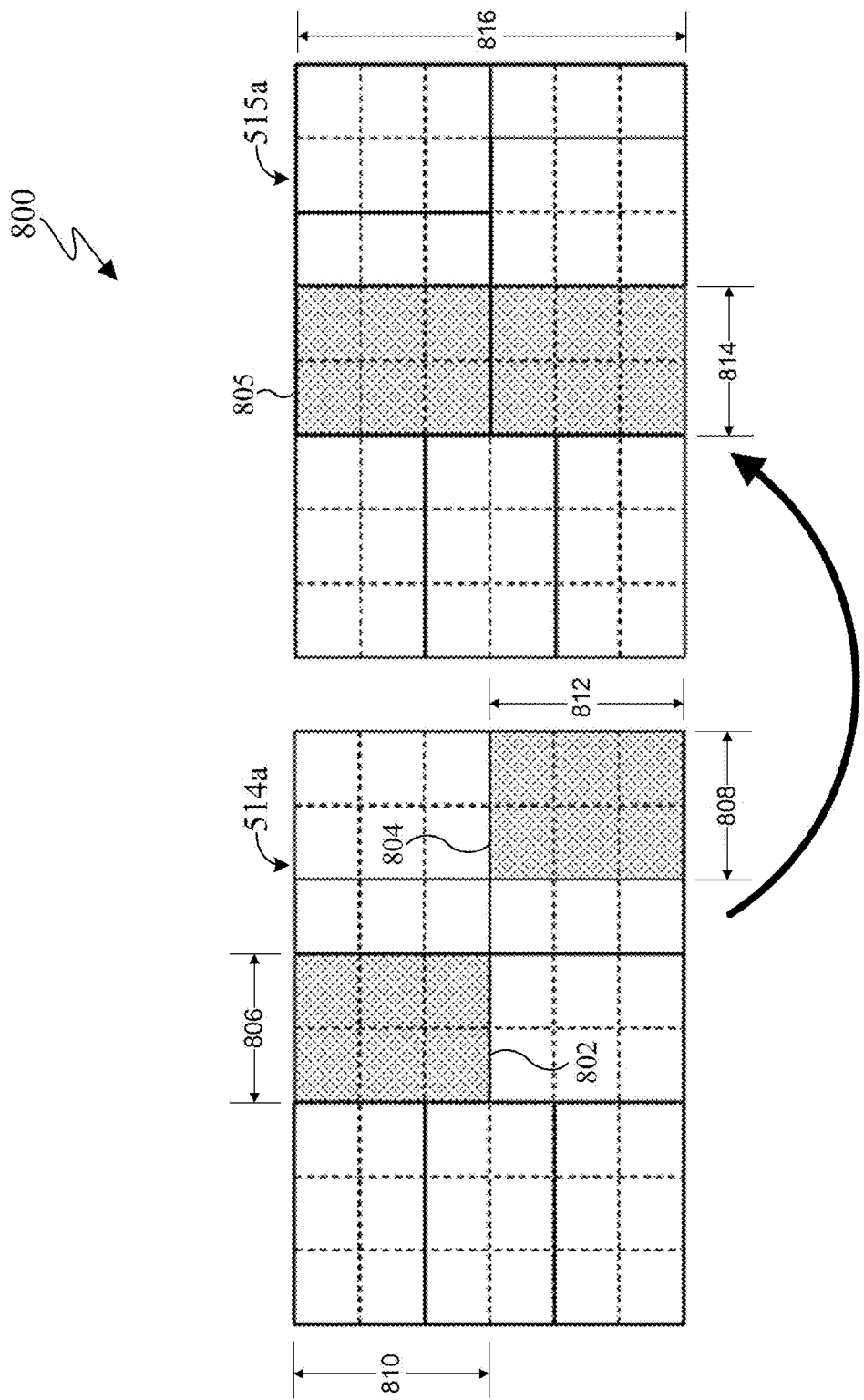
FIGS. 8A and 8B illustrates example appending functions according to various embodiments of the present disclosure.
Figure 8B:
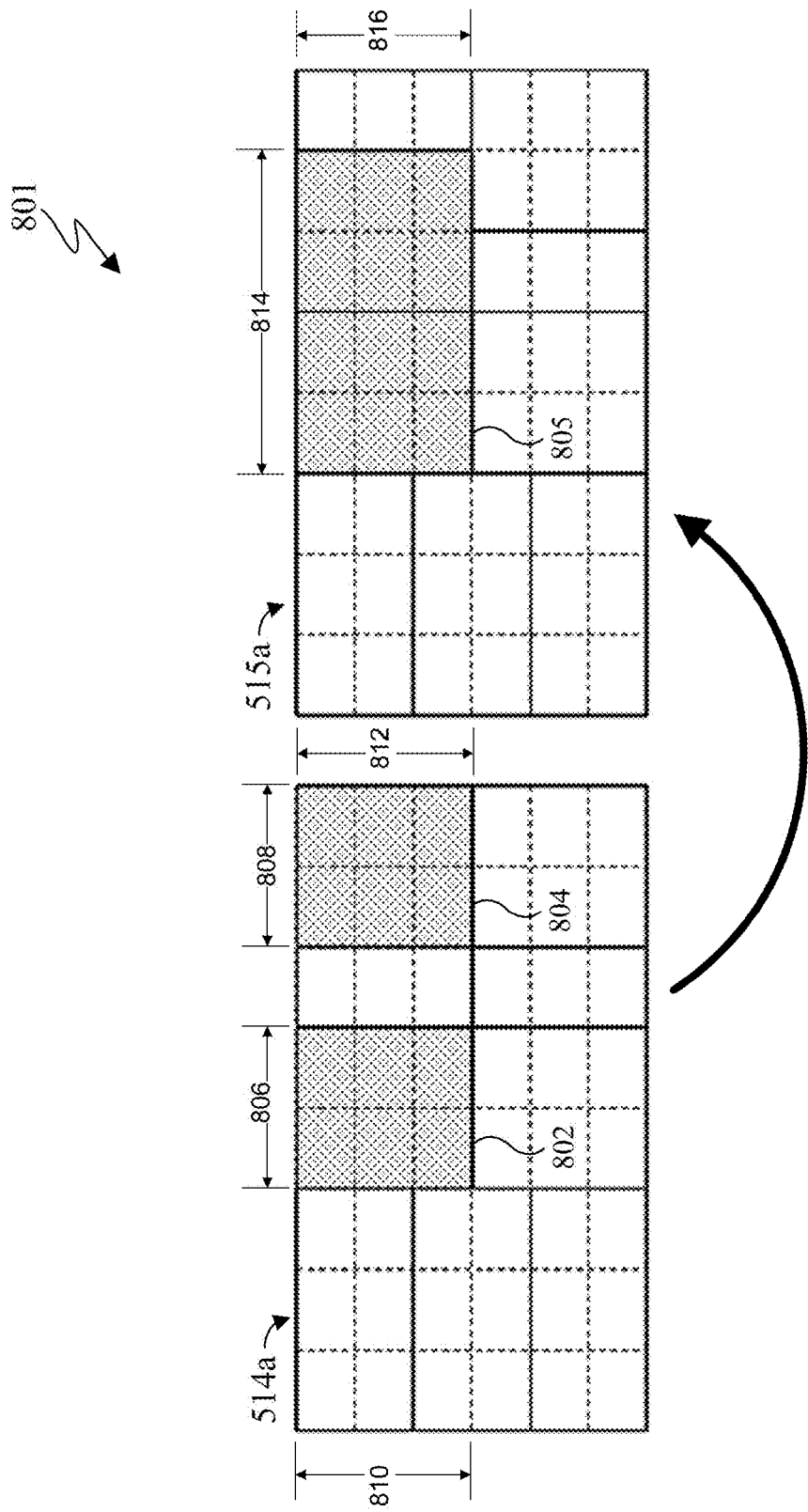

FIGS. 8A and 8B illustrates example appending functions 800, 801 according to various embodiments of the present disclosure. In particular, FIG. 8A illustrates an example vertical appending function 800 and FIG. 8B illustrates an example horizontal appending function 801. The embodiments of the vertical appending function 800 and the horizontal appending function 801 illustrated in FIGS. 8A and 8B are for illustration only. FIGS. 8A and 8B do not limit the scope of this disclosure to any particular implementation of a decoder.

As shown in FIG. 8A, a vertical appending function 800 can be applied to the input elementary bitstream 514a to append a first slice 802 and a second slice 804 with matching slice widths as a combined slice 805 in the output elementary bitstream 515a. If a first slice width 806 of a first slice 802 and a second slice width 808 of a second slice 804 in an input elementary bitstream 514a are identical, then the first slice 802 and the second slice 804 can be vertically appended into a combined slice 805 in an output elementary bitstream 515a by applying the vertical appending function 800. A first slice height 810 of the first slice 802 and a second slice height 812 of the second slice 804 in the input elementary bitstream 514a can be the same or different for the vertical appending function 800. The combined slice 805 can have a combined width 814 and a combined height 816. The combined width 814 for combined slice 805 using the vertical appending function 800 is equal to the first slice width 806 and equal to the second slice width 808. The combined height 816 of the combined slice 805 using the vertical appending function 800 is equal to the first slice height 810 added to the second slice height 812.

In applying the vertical appending function 800, the second slice 804 on the right side of the bottom row of the input elementary bitstream 514a is moved below the first slice 802 on the left side of the top row in the output elementary bitstream 515a. The slices to the left of the second slice 804 on the bottom row of the input elementary bitstream 514a are moved to the right direction sequentially.

In certain embodiments, the first slice 802 could be moved to the right to be above the second slice 804. The tiles to the right of the first slice 802 would be shifted two tiles to the left\ until the first slice 802 is moved above the second slice 804.

As shown in FIG. 8B, a horizontal appending function 801 can be applied to append two or more slices in an input elementary bitstreams 514a into an output elementary bitstream 515. If a first slice height 810 of a first slice 802 and a second slice height 812 of an input elementary bitstream 514a are identical, then the first slice 802 and the second slice 804 of the input elementary bitstream 514a are horizontally concatenated into an output elementary bitstream 515a by applying the horizontal appending function 801. A first slice width 806 of the first slice 802 and a second slice width 808 of the second slice 804 of the input elementary bitstream 514a can be the same or different for the horizontal appending function 801. The combined slice 805 can have a combined width 814 and a combined height 816. The combined height 816 for combined slice 805 using the vertical appending function 800 is equal to the first slice height 810 and equal to the second slice height 812. The combined width 814 of the combined slice 805 using the vertical appending function 800 is equal to the first slice width 806 added to the second slice width 808.

In applying the horizontal appending function 801, the second slice 804 on the right side of the first slice 802 of the input elementary bitstream 514a is moved to the left to be adjacent to the first slice 802 in the output elementary bitstream 515a. The slices to the left of the second slice 804 of the input elementary bitstream 514a are moved to the right direction sequentially.

In certain embodiments, the first slice 802 could be moved to the right to be above the second slice 804. The tiles to the right of the first slice 802 would be shifted two tiles to the left\ until the first slice 802 is adjacent to the second slice 804.

During this operation, SPS, PPS and slice header needs to be rewritten to represent the size of the video of the output elementary bitstream 515a, the information about the slices and tiles such as the number of tile rows and the ID of the tiles needs to be updated. An EVC input elementary bitstream passed as argument of the appending function shall comply to the following rules. At least two of the smallest values of the ID of the tiles in each slice shall be equal to the two object identifiers passed as arguments of the appending function. The height of the slices, number of tile rows of the tiles included in the slices when the uniform tile spacing is used, whose smallest values of the ID of the tiles in each slice are identical as arguments of the appending function are identical.

An EVC elementary stream generated as output of the appending function shall comply to the following rules. The number of VCL NAL units in the output elementary bitstream is equal to the number of VCL NAL units in the input elementary bitstream. For each VCL NAL unit in the output elementary bitstream, there shall exist a VCL NAL unit in the input elementary bitstream that is bit exact identical.

Although FIGS. 8A and 8B illustrate an example appending functions 800, 801, various changes may be made to FIGS. 8A and 8B. For example, the sizes, shapes, and dimensions of components for the vertical appending function 800 and the horizontal appending function 801 can vary as needed or desired. In addition, the vertical appending function 800 and the horizontal appending function 801 may be used in any other suitable decoding process and is not limited to the specific processes described above.

Figure 9:
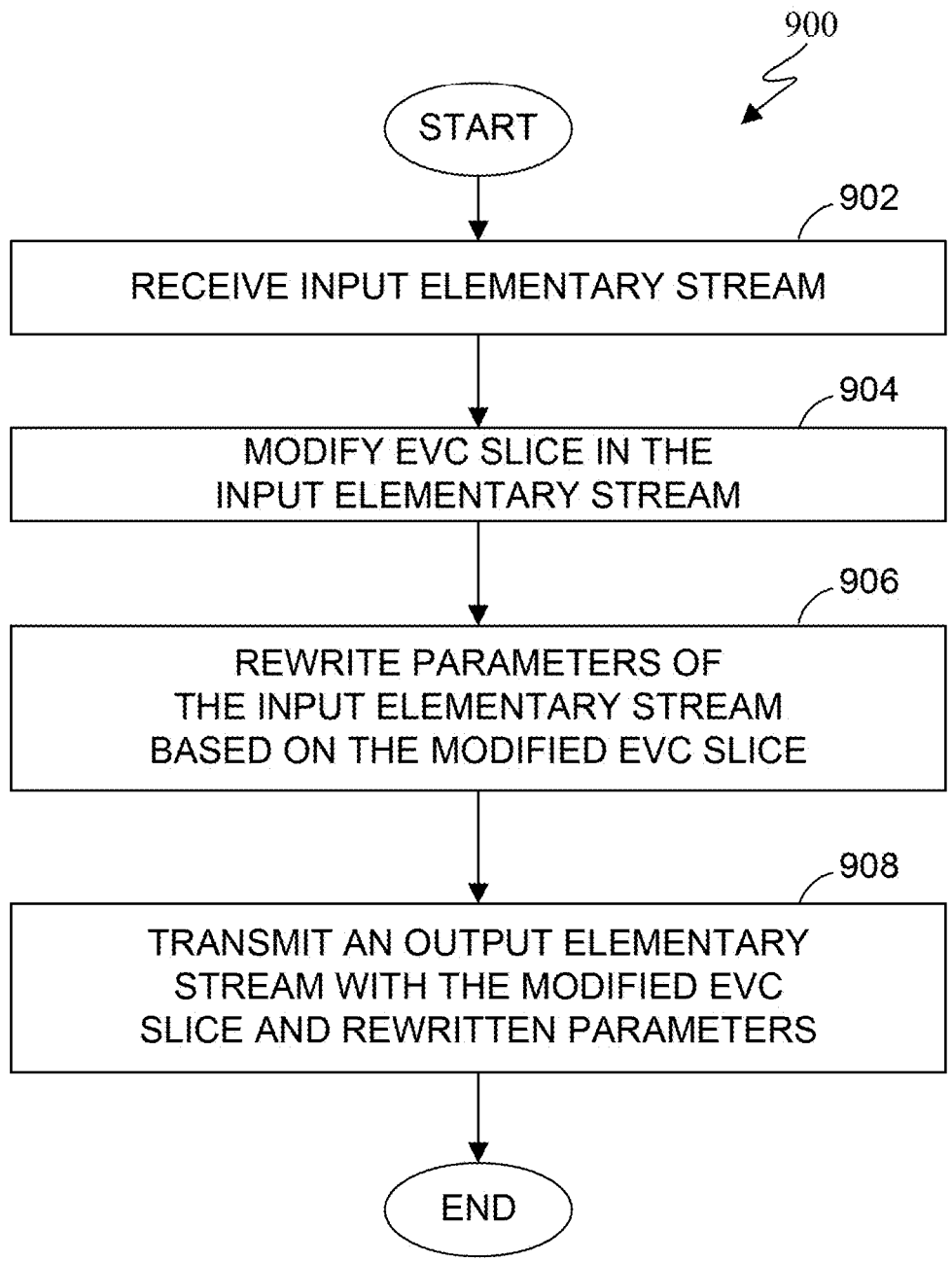
FIG. 9 illustrates an example method for bitstream manipulations of a video decoding engine for EVC according to this disclosure.

FIG. 9 illustrates an example method 900 for bitstream manipulations of a video decoding engine for EVC according to this disclosure. For ease of explanation, the method 900 of FIG. 9 is described as being performed using the decoder 450 of FIG. 4. However, the method 900 may be used with any other suitable system and any other suitable decoder.

As shown in FIG. 9, decoder 450 can receive an input elementary bitstream at step 902. The bitstream can be received from internal storage or received over a communication interface from an external source. Examples of external sources can include encoders 410, other decoders 450, other electronic devices, servers, etc. The decoder 450 can receive multiple bitstreams and perform similar or different modifications on each of the bitstreams. The decoder 450

Decoder 450 can modify an EVC slice 604 in the input elementary bitstream 514 at step 904. The modification can filter an EVC slice 604 in an input elementary bitstream 514 into an output elementary bitstream 515. The modification can include combining a second input elementary bitstream to the first input elementary bitstream into a single output elementary bitstream. When combining the first input elementary bitstream 514a and the second input elementary bitstream 514c, the decoder 450 can determine whether the widths or heights of the first input elementary bitstream 514a and the second input elementary bitstream 514c are identical. When the widths of the first input elementary bitstream 514a and the second input elementary bitstream 514c are identical, the second input elementary bitstream 514c is combined either above or below the first input elementary bitstream 514a in a manner that the left and right sides of the first input elementary bitstream 514a are aligned with the left and right sides of the second input elementary bitstream 514c in the combined output elementary bitstream 515a.

When the lengths of the first input elementary bitstream 514a and the second input elementary bitstream 514c are identical, the second input elementary bitstream 514c is combined either on the left side or the right side of the first input elementary bitstream 514a in a manner that the top and bottom sides of the first input elementary bitstream 514a are aligned with the top and bottom sides of the second input elementary bitstream 514c in the combined output elementary bitstream 515a.

When both the height and widths of the first input elementary bitstream 514a and the second input elementary bitstream 514c are identical, the decoder 450 can be determine which of the vertical inserting function 700 and horizontal inserting function 701 to use. For instance, the decoder 450 can identify which of the identical height and the identical width is less and use the function corresponding to the lesser function. In certain embodiments, the decoder 450 can be preprogrammed to default to one of the vertical inserting function 700 and the horizontal inserting function 701.

In certain embodiments, the modification can include appending a first slice 802 with a second slice 804 within an input elementary bitstream 514. When moving a slice 604 within an input elementary bitstream 514, the decoder 450 determines whether a slice height or a slice width are identical based on the suitable movement of the slice 604. When the first slice 802 is to be vertically appended to the second slice 804, the first slice width 806 is determined to be identical to the second slice width 808. When the first slice 802 is to be horizontally appended to the second slice 804, the first slice height 810 is determined to be identical to the second slice height 812.

Decoder 450 can rewrite parameters of the input elementary bitstream based on the modified EVC slice at step 906. Rewriting the parameters can include updating information about EVC slices and tiles included in the output elementary bitstream. For example, the parameters can include number of tile columns, number of tile rows, and tile identifications. The written parameters can also include rewriting SPS, PPS, and EVC slice headers to represent a size of the output elementary bitstream. The rewritten parameters can include the output stream width 706 and the output stream height 712 for the vertical inserting function 700 and the horizontal inserting function 701. The rewritten parameters can include the combined slice width 814 and the combined slice height 816 for the vertical appending function 800 and the horizontal appending function 801.

Decoder 450 can transmit an output elementary bitstream with the modified EVC slice and rewritten parameters at step 908. Transmitting the output elementary bitstream can include transmitting the output elementary bitstream to a decoder instance, transmitting to another decoder, etc.

Although FIG. 9 illustrates one example of a method 900 for bitstream manipulations of a video decoding engine for EVC, various changes may be made to FIG. 9. For example, while shown as a series of steps, various steps in FIG. 9 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A video decoding device, the decoding device comprising:
   a communication interface configured to receive an input elementary bitstream including a plurality of essential video coding (EVC) slices; and
   a processor operably coupled to the communication interface, the processor configured to:
      modify the plurality of EVC slices in the input elementary bitstream, wherein to modify the plurality of EVC slices, the processor is configured, when a first EVC slice and a second EVC slice have identical heights, to horizontally append the second EVC slice to vertically align the first EVC slice within the input elementary bitstream, and
      rewrite parameters of the input elementary bitstream based on the modified plurality of EVC slices,
   wherein the communication interface is further configured to transmit an output elementary bitstream with the modified plurality of EVC slices and the rewritten parameters.

2. The decoding device of claim 1, wherein the processor is further configured to:
update information about EVC slices and tiles included in the output elementary bitstream, including number of tile columns, number of tile rows, and tile identifications.

3. The decoding device of claim 1, wherein, to rewrite the parameters of the input elementary bitstream, the processor is configured to rewrite at least one of sequence parameter sets (SPS), picture parameter sets (PPS), or EVC slice headers to represent a size of the output elementary bitstream.

4. The decoding device of claim 1, wherein, to modify the plurality of EVC slices, the processor is configured to extract one or more EVC slices from the input elementary bitstream to create the output elementary bitstream with the extracted EVC slices.

5. The decoding device of claim 1, wherein, to modify the plurality of EVC slices, the processor is configured to vertically concatenate an inserted elementary bitstream with an identical width to the input elementary bitstream.

6. The decoding device of claim 1, wherein, to modify the plurality of EVC slices, the processor is configured to horizontally concatenate an inserted elementary bitstream with an identical height to the input elementary bitstream.

7. The decoding device of claim 1, wherein to modify the plurality of EVC slices, the processor is configured, when a third EVC slice and a fourth EVC slice have identical widths, to vertically stack the fourth EVC slice with the third EVC slice.

8. The decoding device of claim 7, wherein the processor is further configured to sequentially move EVC slices between the third EVC slice and the fourth EVC slice in the input elementary bitstream to a right side of the output elementary bitstream.

9. The decoding device of claim 7, wherein the input elementary bitstream has a same width as the output elementary bitstream after the vertically stacking the third EVC slice and the fourth EVC slice.

10. The decoding device of claim 1, wherein:
the first EVC slice is located on a left side of the second EVC slice in the input elementary bitstream, and
the processor is further configured to sequentially move EVC slices on the left side of the second EVC slice in the input elementary bitstream to a right side of the second EVC slice in the output elementary bitstream.

11. A method for a video decoding device, the method comprising:
receiving, using a communication interface of the video decoding device, an input elementary bitstream including a plurality of essential video coding (EVC) slices;
modifying, using a processor operably coupled to the communication interface, the plurality of EVC slices in the input elementary bitstream, wherein modifying the plurality of EVC slices comprises when a first EVC slice and a second EVC slice have identical heights, horizontally appending the second EVC slice to vertically align the first EVC slice within the input elementary bitstream;
rewriting, using the processor, parameters of the input elementary bitstream based on the modified plurality of EVC slices; and
transmitting, using the communication interface, an output elementary bitstream with the modified plurality of EVC slices and the rewritten parameters.

12. The method of claim 11, further comprising:
updating, using the processor, information about EVC slices and tiles included in the output elementary bitstream, including number of tile columns, number of tile rows, and tile identifications.

13. The method of claim 11, wherein rewriting the parameters of the input elementary bitstream comprises rewriting, using the processor, at least one of sequence parameter sets (SPS), picture parameter sets (PPS), or EVC slice headers to represent a size of the output elementary bitstream.

14. The method of claim 11, wherein modifying the plurality of EVC slices comprises extracting, using the processor, one or more EVC slices from the input elementary bitstream to create the output elementary bitstream with the extracted EVC slices.

15. The method of claim 11, wherein modifying the plurality of EVC slices comprises vertically concatenating, using the processor, an inserted elementary bitstream with an identical width to the input elementary bitstream.

16. The method of claim 11, wherein modifying the plurality of EVC slices comprises horizontally concatenating, using the processor, an inserted elementary bitstream with an identical height to the input elementary bitstream.

17. The method of claim 11, wherein modifying the plurality of EVC slicescomprises, when a third EVC slice and a fourth EVC slice have identical widths, vertically stacking, using the processor, the fourth EVC slice with the third EVC slice.

18. The method of claim 17, further comprising:
sequentially moving, using the processor, EVC slices between the third EVC slice and the fourth EVC slice in the input elementary bitstream to a right side of the output elementary bitstream.

19. The method of claim 17, wherein the input elementary bitstream has a same width as the output elementary bitstream after the vertically stacking the third EVC slice and the fourth EVC slice.

20. The method of claim 1, wherein:
the first EVC slice is located on a left side of the second EVC slice in the input elementary bitstream, and
the method further comprises:
sequentially moving, using the processor, EVC slices on the left side of the second EVC slice in the input elementary bitstream to a right side of the second EVC slice in the output elementary bitstream.

* * * * *